United States Patent
Suzuki et al.

(10) Patent No.: US 11,408,344 B2
(45) Date of Patent: Aug. 9, 2022

(54) COOLING SYSTEM FOR AIRCRAFT GAS TURBINE ENGINE

(71) Applicant: IHI Corporation, Tokyo (JP)

(72) Inventors: Fuminori Suzuki, Tokyo (JP); Naoki Seki, Tokyo (JP); Toshikazu Kobayashi, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/304,947

(22) Filed: Jun. 29, 2021

(65) Prior Publication Data

US 2021/0324799 A1 Oct. 21, 2021

Related U.S. Application Data

(63) Continuation of application No. PCT/JP2020/003293, filed on Jan. 30, 2020.

(30) Foreign Application Priority Data

Feb. 13, 2019 (JP) .............................. JP2019-023511

(51) Int. Cl.
*F02C 7/12* (2006.01)
(52) U.S. Cl.
CPC .......... *F02C 7/12* (2013.01); *F05D 2220/323* (2013.01); *F05D 2260/20* (2013.01)
(58) Field of Classification Search
CPC .. F02C 7/12; F05D 2220/323; F05D 2260/20; F01D 15/10; F01D 25/24
See application file for complete search history.

(56) References Cited

U.S. PATENT DOCUMENTS

| 5,265,408 | A | 11/1993 | Sheoran et al. |
| 6,092,360 | A | 7/2000 | Hoag et al. |
| 2003/0080244 | A1 | 5/2003 | Dionne |
| 2004/0060278 | A1 | 4/2004 | Dionne |
| 2006/0138779 | A1 | 6/2006 | Bouiller et al. |
| 2007/0063098 | A1 | 3/2007 | Dionne |
| 2008/0245062 | A1 | 10/2008 | Dionne |

(Continued)

FOREIGN PATENT DOCUMENTS

| JP | 2005-507044 A | 3/2005 |
| JP | 2006-153013 A | 6/2006 |
| JP | 2018-184162 A | 11/2018 |

OTHER PUBLICATIONS

International Search Report dated Apr. 7, 2020 in PCT/JP2020/003293 filed on Jan. 30, 2020, 3 pages.

*Primary Examiner* — Todd E Manahan
*Assistant Examiner* — Rodolphe Andre Chabreyrie
(74) *Attorney, Agent, or Firm* — Oblon, McClelland, Maier & Neustadt, L.L.P.

(57) ABSTRACT

A cooling system includes: a core casing configured to house a compressor, a combustion chamber, and a turbine; a tail cone configured to form at least part of an exhaust passage of the turbine together with the core casing; struts configured to connect the core casing with a support body of the tail cone; a housing installed in the tail cone, configured to house an electrical apparatus; and at least one primary duct configured to connect between an internal space of the housing and an outlet passage of the compressor or a discharge port of a blower installed in a gas turbine engine via at least one of the struts and a radial outside of the core casing.

7 Claims, 8 Drawing Sheets

(56) References Cited

U.S. PATENT DOCUMENTS

| | | |
|---|---|---|
| 2012/0117371 A1* | 5/2012 | Murzeau .............. H03K 19/177 |
| | | 713/100 |
| 2012/0227371 A1 | 9/2012 | Johnson et al. |
| 2013/0133336 A1 | 5/2013 | Barnett et al. |
| 2014/0079530 A1 | 3/2014 | Ferch et al. |
| 2018/0051702 A1* | 2/2018 | Kupiszewski .......... B64C 21/06 |
| 2018/0304753 A1 | 10/2018 | Vondrell et al. |
| 2019/0316486 A1* | 10/2019 | Roberge .................. H02K 9/16 |
| 2020/0291810 A1* | 9/2020 | Spierling ............... B64D 33/04 |
| 2020/0324906 A1 | 10/2020 | Vondrell et al. |

* cited by examiner

COOLING SYSTEM FOR AIRCRAFT GAS TURBINE ENGINE

CROSS REFERENCE TO RELATED APPLICATIONS

This application is a continuation application of International Application No. PCT/JP2020/003293, now WO2020/166342, filed on Jan. 30, 2020, which claims priority to Japanese Patent Application No. 2019-023511, filed on Feb. 13, 2019, the entire contents of which are incorporated by reference herein.

BACKGROUND

1. Technical Field

The present disclosure is related to a cooling system for an aircraft gas turbine engine.

2. Description of the Related Art

An aircraft gas turbine engine is equipped with an electric generator in addition to propulsion mechanisms such as compressors, turbines, and the like. The electric generator supplies electric power to an electrical system of the fuselage. A typical electric generator is mounted on an accessory gearbox (AGB: Accessory-drive Gearbox) provided near the fan case.

A multi-shaft gas turbine engine includes multiple stages of compressors and turbines. In this engine, a low-pressure compressor is connected with a low-pressure turbine through a low-pressure shaft, and a high-pressure compressor is connected with a high-pressure turbine through a high-pressure shaft. The electric generator is connected to the high-pressure shaft via a gearbox, a drive shaft, and the like. Part of the rotational energy of the high-pressure shaft is transmitted to the electric generator through the gearbox or the like, thereby driving the electric generator.

In recent years, demand for electric power in aircraft has been increasing in accordance with demands from electrical motorization of aircraft (MEA: More Electric Aircraft). Along with the increase in demand, a power generation method using extraction force from the low-pressure shaft has been proposed in addition to the conventional power generation method using extraction force from the high-pressure shaft. In the power generation system disclosed in Japanese Patent Application Laid-Open Application No. 2006-153013, the electric generator is installed behind the low-pressure turbine and is driven by a spline connection with the low-pressure shaft.

SUMMARY

Electrical apparatus such as an electric generator and the like, which generates heat during operation, is required to be constantly cooled to prevent thermal damage. When such electrical apparatus is installed behind the low-pressure turbine, the electrical apparatus is located radially inward of the annular exhaust passage. That is, the electrical apparatus is surrounded by hot exhaust gas flowing through the exhaust passage. An oil cooling system is most commonly used to cool such electrical apparatus. However, it is necessary to design the oil cooling system according to the shape of the object to be cooled in advance, and the structure is likely to be complicated.

The present disclosure has been made in view of the above circumstances. Specifically, an object of the present disclosure is to provide a cooling system in a gas turbine engine for an aircraft that is capable of cooling electrical apparatus installed behind a turbine with a simple configuration.

An aspect of the present disclosure is a cooling system for an aircraft gas turbine engine, the cooling system including: a core casing configured to house a compressor, a combustion chamber, and a turbine; a tail cone configured to form at least part of an exhaust passage of the turbine together with the core casing; struts configured to connect between the core casing with a support body of the tail cone; a housing installed in the tail cone, configured to house an electrical apparatus; and at least one primary duct configured to connect between an internal space of the housing and an outlet passage of the compressor or a discharge port of a blower installed in the gas turbine engine via at least one of the struts and a radial outside of the core casing.

The cooling system may further include an electric wire configured to connect to the electrical apparatus. The primary duct may include a front primary duct connected to the outlet passage of the compressor or the discharge port of the blower; a rear primary duct connected to the housing; and an inter-connecting box provided radially outward of the core casing and contacting between the front primary duct and the rear primary duct. The inter-connecting box may include a terminal board. The electric wire may be connected from the terminal board to the electric apparatus through the rear primary duct.

The housing may include a discharge port.

The rear primary duct may include a shielding structure against heat from the combustion chamber and the turbine.

The cooling system may further include a secondary duct configured to connect between a bypass passage behind the fan and the internal space of the housing via a radially outside of the core casing and a strut of the struts other than the strut through which the primary duct passes. The secondary duct may branch at a position radially outward of the strut in which the secondary duct is laid, and may open toward the exhaust passage.

The cooling system may further include an electric wire accommodated in the secondary duct and connected to the electrical device. The secondary duct may include: a front secondary duct connected to the bypass passage; a rear secondary duct extending from the front secondary duct to the housing; and the rear secondary duct has a shielding structure against heat from the combustion chamber and the turbine.

According to the present disclosure, in an aircraft gas turbine engine, it is possible to provide a cooling system capable of cooling electrical apparatus installed behind a turbine with a simple configuration.

BRIEF DESCRIPTION OF THE DRAWINGS

FIG. 4A is a IVA-IVA cross-sectional view of the front primary duct in FIG. 3, and FIG. 4B is a IVB-IVB cross-sectional view of the rear primary duct in FIG. 3.

FIG. 8A is a perspective view of the entire secondary duct, FIG. 8B is a VIIIA-VIIIA cross-sectional view of the front secondary duct in FIG. 8A, and FIG. 8C is a VIIIB-VIIIB cross-sectional view of the rear secondary duct in FIG. 8A.

DESCRIPTION OF THE EMBODIMENTS

Figure 1:
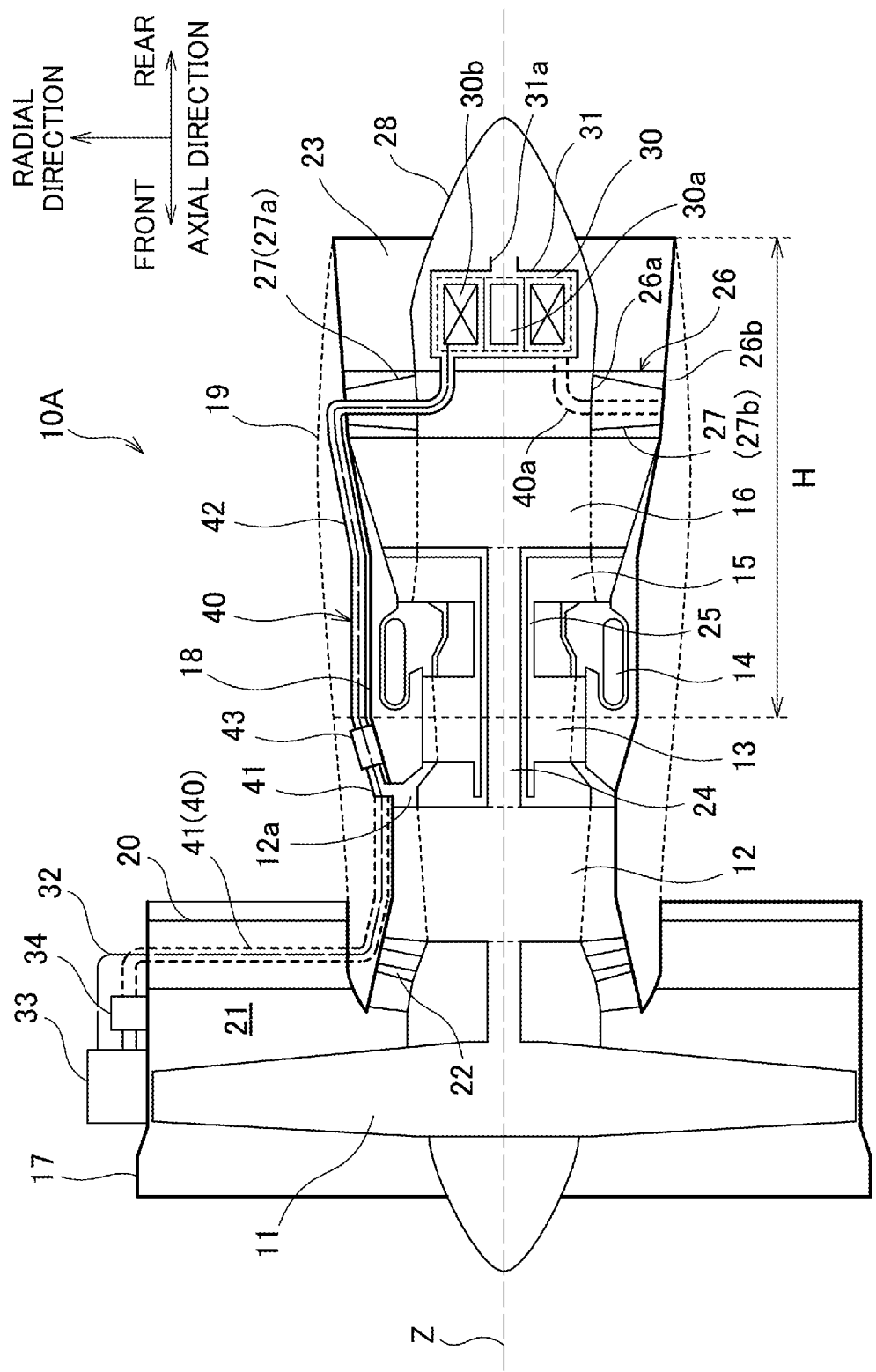
FIG. 1 is a diagram illustrating a configuration of a gas turbine engine (engine) for an aircraft, according to a first embodiment of the present disclosure.

A cooling system according to an embodiment of the present disclosure will be described below with reference to the accompanying drawings. The same reference numerals are used to denote the same parts in the drawings, and duplicate descriptions are omitted.

The aircraft gas turbine engine equipped with the cooling system according to the present disclosure is, for example, a turbofan engine, a turbojet engine, a turboprop engine, a turboshaft engine, and the like. The gas turbine engine according to the present embodiment is a multi-shaft gas turbine engine having multiple stages of compressors and turbines. In the following description, a turbofan engine is given as an example of a multi-shaft gas turbine engine for an aircraft. For the convenience of explanation, the turbofan engine is simply referred to as an "engine".

First Embodiment

Figure 2:
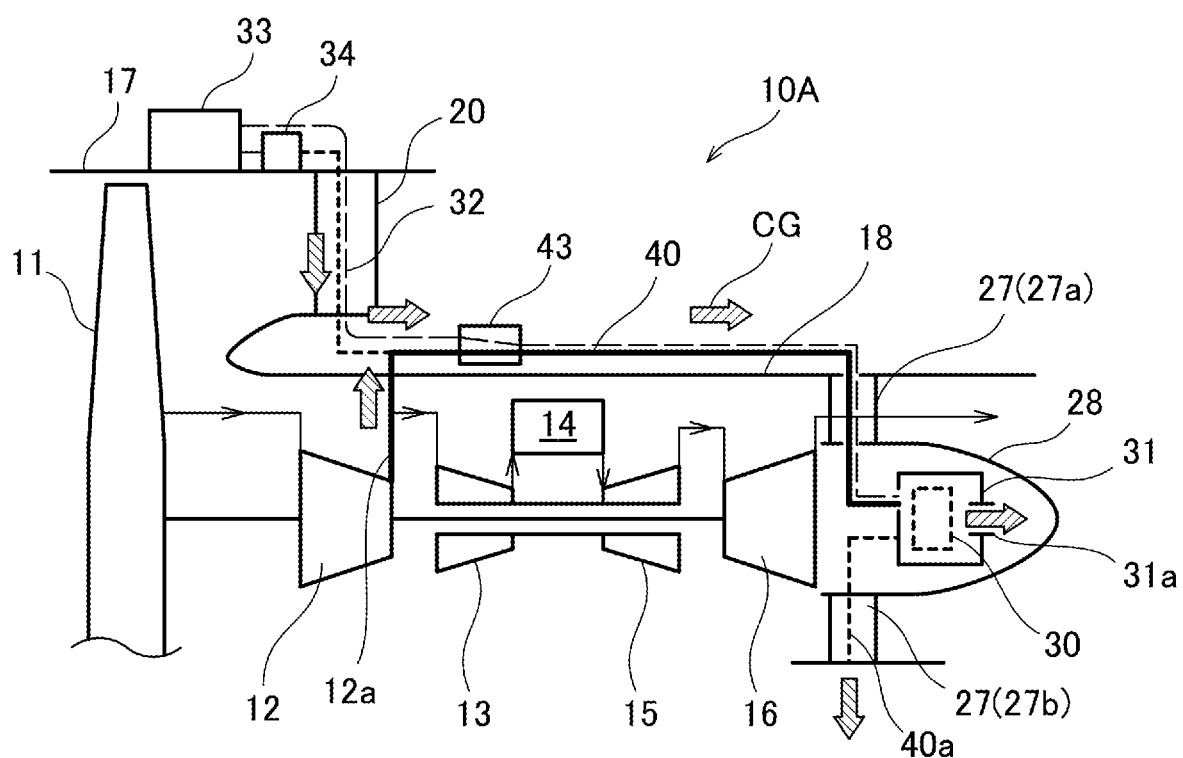
FIG. 2 is a diagram for explaining a cooling system according to the first embodiment.

A first embodiment according to the present disclosure will be described. FIG. 1 is a diagram illustrating a configuration of an engine 10A for an aircraft, according to a first embodiment of the present disclosure. FIG. 2 is a diagram for explaining a cooling system according to the first embodiment. As shown in FIG. 1, the engine 10A is a dual-shaft turbofan engine. The engine 10A includes a fan 11, a low-pressure compressor (compressor) 12, a high-pressure compressor (compressor) 13, a combustion chamber 14, a high-pressure turbine (turbine) 15, and a low-pressure turbine (turbine) 16. These are arranged on a central axis Z from the fore of the engine toward the aft thereof in the order of description. The hot section H of the engine 10A is positioned rearward from the combustion chamber 14 during the operation of the engine 10A. The hot section H is heated by combustion gas and radiation heat generated by the combustion chamber 14.

The engine 10A includes a fan casing 17 and a core casing 18 provided behind the fan casing 17. The fan casing 17 houses a fan 11. The core casing 18 houses the low-pressure compressor 12, the high-pressure compressor 13, the combustion chamber 14, the high-pressure turbine 15, and the low-pressure turbine 16. The core casing 18 is surrounded by a cover (core cowl) 19.

An outlet guide vane 20 is provided behind the fan 11. The outlet guide vane 20 connects between the fan casing 17 and the core casing 18. With this, the relative positions of these casings are maintained, and a bypass passage 21 is formed. The bypass passage 21 extends between a nacelle (not shown) housing the engine 10A and the cover 19. On the other hand, a core passage 22 is formed inside the core casing 18. A gas in core passage 22 flows into the low-pressure compressor 12 as working fluid. In this way, the core casing 18 and the cover 19 divide the flow path behind the fan 11 into the bypass passage 21 and the core passage 22.

The basic configuration and operation of the engine 10A (i.e. compression of the gas, combustion of the gas, conversion of pressure energy of the gas to kinetic (rotational) energy, etc.) may be the same as the conventional ones. Specifically, the fan 11 sucks the gas (working fluid) and discharges it backward. A portion of the gas that has passed through the fan 11 flows into the low-pressure compressor 12 via the core passage 22, and the remainder is discharged backward from the engine 10A via the bypass passage 21. The low-pressure compressor 12 compresses the gas flowing in from the fan 11 and discharges it to the high-pressure compressor 13. The high-pressure compressor 13 further compresses the gas compressed by the low-pressure compressor 12 and supplies it to the combustion chamber 14.

The combustion chamber 14 combusts a mixed gas of fuel and the gas compressed by the high-pressure compressor 13 and discharges it to the high-pressure turbine 15. The combustion gas is expanded while passing through the high-pressure turbine 15 to rotate the high-pressure turbine 15. The rotational energy is transmitted to the high-pressure compressor 13 via the high-pressure shaft 25 to rotate the high-pressure compressor 13.

Combustion gas passed through the high-pressure turbine 15 rotates the low-pressure turbine 16 while flowing through the low-pressure turbine 16 and further expanding. The rotational energy is transmitted to the low-pressure compressor 12 and the fan 11 via the low-pressure shaft 24 to rotate the low-pressure compressor 12 and the fan 11. The combustion gas passed through the low-pressure turbine 16 is discharged to the outside of the engine 10A via the exhaust passage 23.

The low-pressure compressor 12 and the low-pressure turbine 16 are connected through a low-pressure shaft 24, and the high-pressure compressor 13 and the high-pressure turbine 15 are connected through a high-pressure shaft 25. It should be noted that the engine according to the present disclosure may be a triple-shaft type engine further comprising an intermediate-pressure compressor (not shown) and an intermediate-pressure turbine (not shown).

As shown in FIG. 1, an exhaust frame 26 is attached to a rear portion of the low-pressure turbine 16. The exhaust frame 26 includes an inner case 26a and an outer case 26b arranged concentrically with respect to the central axis Z, and functions as a support body for the low-pressure turbine 16 and a tail cone 28.

Struts 27 are radially provided between the inner case 26a and the outer case 26b with respect to the central axis Z, and connects between the inner case 26a and the outer case 26b. The struts 27 maintain a space between the inner case 26a and the outer case 26b, and forms an exhaust passage 23 between them. The outer case 26b is attached to the core casing 18, and the inner case 26a supports tail cone 28. That is, the struts 27 connect between the core casing 18 and the support body (i.e. the inner case 26a) of the tail cone 28.

A tail cone 28 is attached to a rear portion of the exhaust frame 26. The tail cone 28 is formed in a substantially conical shape and forms at least part of the exhaust passage 23 together with the core casing 18.

The engine 10A includes an electric generator 30 as an example of an electric apparatus which generates heat. The electric generator 30 is installed inside a tail cone 28 and housed in a housing 31. The electric generator 30 generates, for example, electric power for the fuselage and the engine 10A.

The electric generator 30 includes a rotor 30a and a stator 30b provided around the rotor 30a. The rotor 30a is a field system (i.e. a magnetic field generator) rotated by the rotational energy of the low-pressure shaft 24. The stator 30b is an armature that generates electric power by the magnetic field of rotor 30a.

The rotor 30a includes a rotor core (not shown) and a plurality of magnets (not shown) held by the rotor core. The rotational energy of the low-pressure shaft 24 is transmitted to the rotor 30a. By the transmission of the rotational energy, the rotor 30a is rotated.

The stator 30b includes a coil (not shown) and a stator core (not shown) constituting a magnetic circuit. The stator 30b is positioned in the housing 31 while being exposed to the internal space of the housing 31.

An output of the electric generator 30 (i.e. stator 30b) is connected to an input of a power converter 33 via an electric wire 32. The power converter 33 is mounted, for example, on an outer periphery of the fan casing 17. In this case, the electric wire 32 is drawn out of the housing 31 and connected to the power converter 33 via the primary duct 40 (described later) and the outlet guide vane 20.

The electric wire 32 is, for example, a rod-shaped metal member. An outer periphery of the electric wire 32 is covered with an insulating material. Part of the electric wire 32 located in the hot section H is covered with a heat-resistant insulating material such as polyimide resin, ceramic, or the like. Coating material on other parts of the electric wire 32 is not required to have heat resistance.

As shown in FIGS. 1 and 2, the engine 10A includes a primary duct 40. The primary duct 40 is a tubular member extending from the front to the rear of the engine 10A, and constitutes a passage of the gas. The primary duct 40 is formed of heat-resistant alloy. However, part of the primary duct 40 forward of the hot section H (e.g. the front primary duct 41 described later) may be formed of flexible resin (e.g. carbon fiber reinforced plastics (CFRP)), elastic material such as an elastomer, or other non-metallic material.

The primary duct 40 connects between the outlet passage 12a of the low-pressure compressor 12 and the internal space of the housing 31 via at least one strut 27a of the struts 27 and the radial outside of the core casing 18. In other words, the primary duct 40 extends from the outlet passage 12a to the housing 31 in the tail cone 28 through a space between the core casing 18 and the cover 19 and at least one strut 27a of the struts 27a.

While the engine 10A is operating, an air pressure in the outlet passage 12a is sufficiently higher than an air pressure in the housing 31. A temperature in the outlet passage 12a is sufficiently lower than temperature of the electric generator 30 in operation. Therefore, a cooling gas CG extracted from the outlet passage 12a flows into the housing 31 through the primary duct 40, thereby enabling to cool the electric generator 30.

The part of the primary duct 40 which passes through the strut 27a is most likely to be heated. Therefore, the strut 27a may have a shielding structure 56 (see FIG. 4) described below. Since the strut 27a as part of the primary duct 40 has the shielding structure 56, the inflow of heat into the strut 27a can be suppressed, and the temperature rise of the cooling gas CG can be suppressed.

As shown by the dotted lines in FIGS. 1 and 2, the primary duct 40 may be connected to a discharge port of the blower 34 instead of connecting to the outlet passage 12a of the low-pressure compressor 12. That is, the primary duct 40 may connect between the discharge port of the blower 34 and the internal space of the housing 31. The blower 34 is, for example, an intake fan for air-cooling the power converter 33, and is installed together with the power converter 33 on the outer periphery of the fan casing 17. Therefore, when the primary duct 40 is connected to the discharge port of the blower 34, the primary duct 40 extends through the inside of the outlet guide vane 20.

The temperature of the gas discharged from the blower 34 is also sufficiently lower than the temperature of the electric generator 30 in operation. The gas discharged from the blower 34 flows through the primary duct 40 into the housing 31, thereby enabling to cool the electric generator 30.

As described above, the cooling gas CG from the primary duct 40 flows into the housing 31. To facilitate the discharge of this gas, the cooling system according to the present embodiment may have at least one of a discharge port 31a and an exhaust duct 40a. As shown in FIG. 1, the discharge port 31a is formed on a wall surface of the housing 31. On the other hand, the exhaust duct 40a extends from the housing 31 into the strut 27 (strut 27b) other than the struts 27 (strut 27a) provided with the primary duct 40 and opens to the outer surface of the core casing 18.

During the operation of the engine 10A, the hot section H is heated due to the combustion by the combustion chamber 14. On the other hand, the electric wire 32 as described above has been laid near the hot section H. Therefore, the electric wire 32 is likely to be damaged by heat from the hot section H. To prevent such thermal damage of the electric wire 32, the primary duct 40 may accommodate at least part of the electric wire 32 located in the hot section H. As described above, relatively low-temperature gas flows through the primary duct 40. The primary duct 40 itself also shields heat. Accordingly, the electric wire 32 can be protected from the heat of the hot section H.

As shown in FIG. 1, the primary duct 40 may include a front (fore) primary duct 41, a rear (aft) primary duct 42, and an inter-connecting box 43. An upstream side of the front primary duct 41 is connected to the outlet passage 12a of the low-pressure compressor 12 or the discharge port of the blower 34. The rear primary duct 42 is provided at least at the hot section H, and a downstream side of the rear primary duct 42 is connected to the housing 31. The inter-connecting box 43 is provided radially outward of the core casing 18 and contacts (connects) between the downstream side of the front primary duct 41 and the upstream side of the rear primary duct 42. In other words, the primary duct 40 may be divided into a front duct and a rear duct with the inter-connecting box 43 interposed therebetween.

Figure 3:
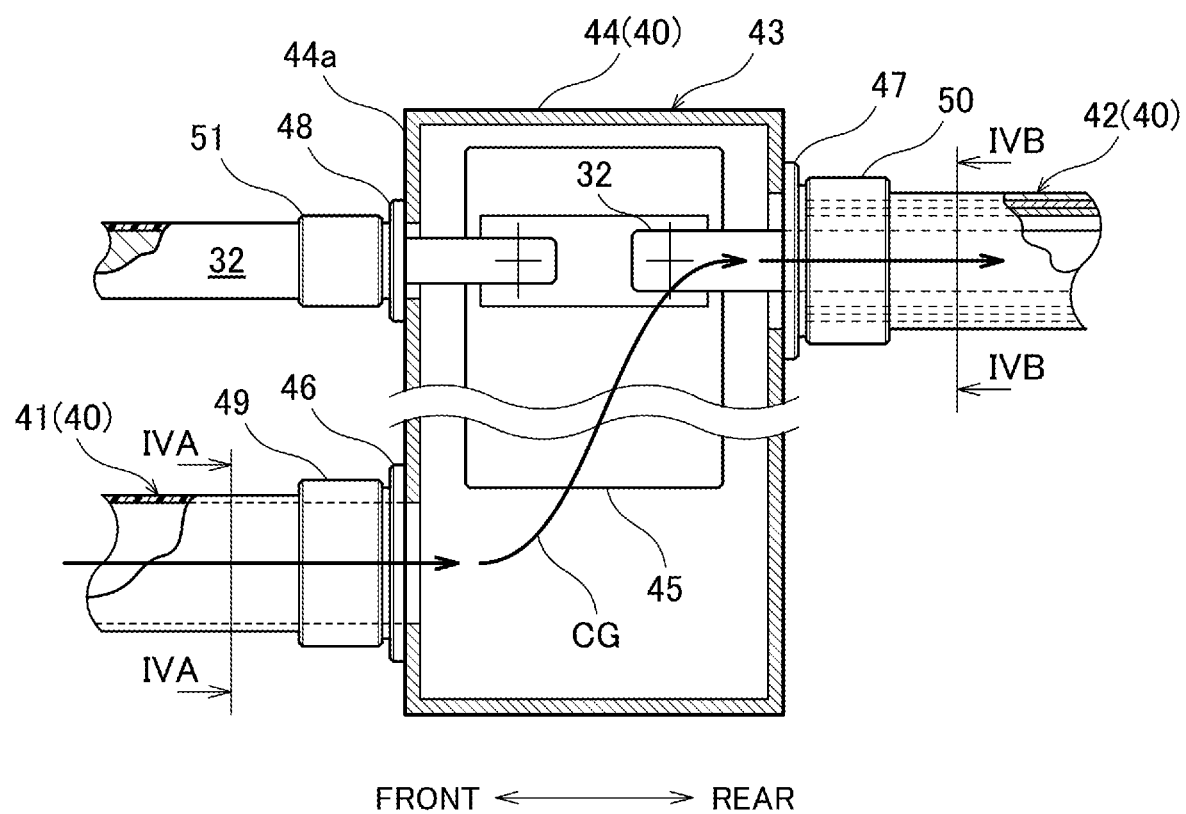
FIG. 3 is a sectional view partially illustrating a front primary duct, an inter-connecting box, and a rear primary duct according to the first embodiment.
Figure 4A:
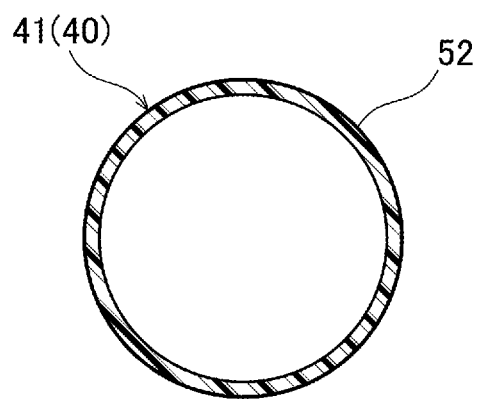
FIGS. 4A and 4B are diagrams for explaining the front and rear primary ducts according to the first embodiment.
Figure 4B:
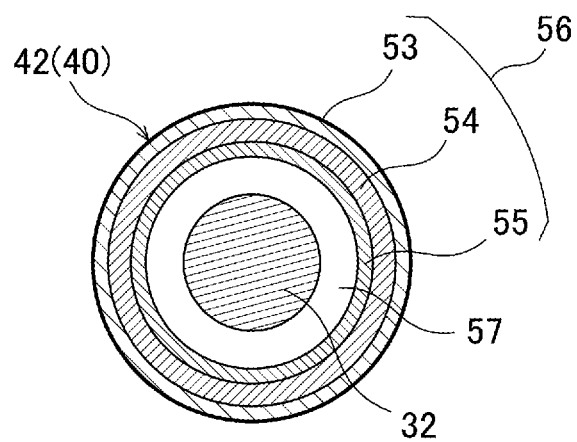

FIG. 3 is a sectional view partially illustrating the front primary duct 41, the inter-connecting box 43, and the rear primary duct 42 according to the first embodiment. FIGS. 4A and 4B are diagrams for explaining the front primary duct 41 and the rear primary duct 42 according to the first embodiment. FIG. 4A is a IVA-IVA cross-sectional view of the front primary duct in FIG. 3. FIG. 4B is a IVB-IVB cross-sectional view of the rear primary duct in FIG. 3.

As shown in FIG. 3, the inter-connecting box 43 includes a hollow box 44, a terminal board 45 installed inside the box 44, and receptacles (female connectors) 46, 47 and 48 attached to the box 44 (for example, an outer surface 44a of the box 44). The box 44 is configured to permit the flow of gas from the front primary duct 41 to the rear primary duct 42, and configured to suppress the leakage of gas from other places as much as possible.

The receptacle 46 is connected to a plug (male connector) 49 of the front primary duct 41. The receptacle 47 is connected to a plug (male connector) 50 of the rear primary duct 42. Each of the receptacle 46 and the receptacle 47 is formed with a through-hole (not shown) contacting (connecting) between the corresponding duct and the internal space of the box 44. With this, the cooling gas CG is allowed to flow from the front primary duct 41 to the rear primary duct 42 through the inter-connecting box 43.

In the rear primary duct 42, the electric wire 32 connected to the electric generator 30 is accommodated. The electric wire 32 is led out of the receptacle 47 into the inter-connecting box 43 (i.e. exposed in the inter-connecting box 43) and is connected to the terminal board 45. That is, the electric wire 32 is connected from the terminal board 45 to the electric generator 30 through the rear primary duct 42.

The receptacle 48 is connected to a plug (male connector) 51 of the electric wire 32, and the electric wire 32 is connected to the terminal board 45. Thus, the output of the electric generator 30 and the input of the power converter 33 are electrically connected via the inter-connecting box 43 (terminal board 45).

As shown in FIG. 4A, the front primary duct 41 has a tubular main body 52. The front primary duct 41 is positioned in front of the hot section H, and is hardly damaged by heat. Therefore, the main body 52 may be formed of heat-resistant alloy as same as the rear primary duct 42, otherwise may be formed of flexible resin (e.g. carbon fiber reinforced plastics (CFRP)), elastic material such as an elastomer, or other non-metallic material.

As shown in FIG. 4B, the rear primary duct 42 has a tubular main body 53, a heat-insulating material 54 provided inside the main body 53, and a sheath 55 provided inside the heat-insulating material 54. The main body 53 and the sheath 55 are formed in a tubular shape, and are concentrically positioned with a space where the heat-insulating material 54 is provided therebetween. That is, the main body 53 and the sheath 55 constitute a double-wall structure. The main body 53 and the sheath 55 are formed of material having heat resistance. Such material is, for example, a heat-resistant alloy. The heat-insulating material 54 is provided between an inner surface of the main body 53 and an outer surface of the sheath 55. The heat-insulating material 54, together with sheath 55, prevents excessive heat transfer (radiation) to the electric wire 32. That is, the primary duct 40 (rear primary duct 42) has a shielding structure 56 against heat from the hot section H and protects the electric wire 32.

The sheath 55 forms a cavity 57 inside thereof. The cavity 57 accommodates the electric wire 32 and ensures gas flow. That is, the cross-sectional area of the cavity 57 perpendicular to the longitudinal direction of the rear primary duct 42 is larger than the cross-sectional area of the electric wire 32, and is set to a value capable of ensuring gas flow.

Figure 5:
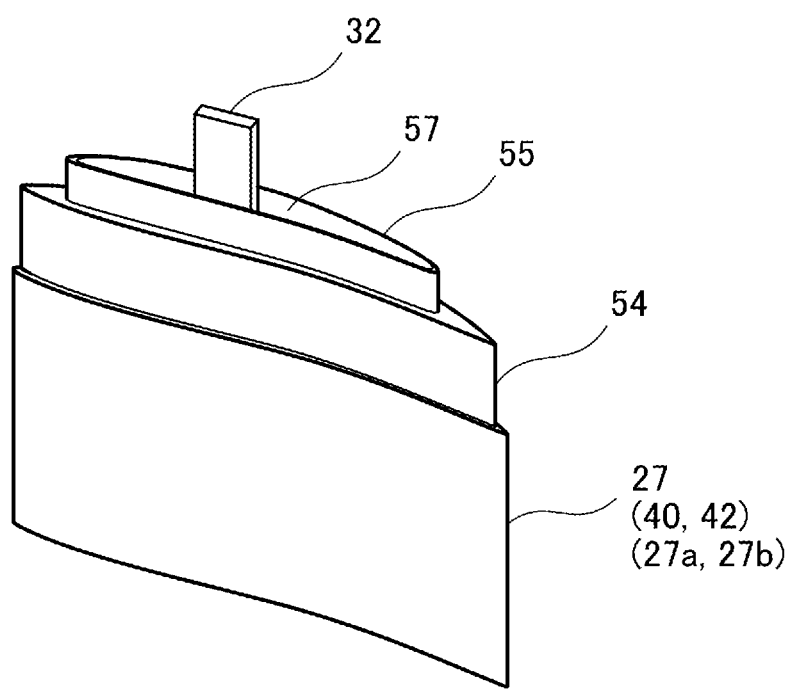
FIG. 5 is an exploded perspective view illustrating each embodiment strut of the present disclosure.

At least one strut 27a of the struts 27 functions as the main body 53 of the rear primary duct 42. FIG. 5 is an exploded perspective view of the strut 27a serving also as the primary duct 40 (rear primary duct 42). Each of the struts 27 including the strut 27a has an airfoil cross-section and extends in the radial direction. Each strut 27 is made of a heat-resistant alloy and has sufficient mechanical strength for stably connecting between the inner case 26a and the outer case 26b.

As shown in FIG. 5, the strut 27a functions as the main body 53 of the primary duct 40 (rear primary duct 42) and accommodates the electric wire 32. Accordingly, the heat-insulating material 54 is provided inside the strut 27a, and the sheath 55 is provided inside the heat-insulating material 54.

Part of the sheath 55 provided in the strut 27a has a flat cross-section similar to that of the strut 27a. In like with this shape, the electric wire 32 may also have a flat cross-section (e.g. a rectangular cross-section).

As described above, the part of the electric wire 32 to be laid in the hot section H is accommodated in the primary duct 40 (rear primary duct 42). In the primary duct 40 (rear primary duct 42), the cooling gas CG flows toward the housing 31. Accordingly, part of the electric wire 32 to be laid in the hot section H is shielded from the heat of the hot section H by the primary duct 40 (rear primary duct 42) and is cooled by the cooling gas CG. Accordingly, the thermal damage of the electric wire 32 can be prevented.

The number of electric wires 32 accommodated in the strut 32a is not limited to one, and may be plural. Similarly, the number of primary ducts 40 is not limited to one. That is, the cooling system according to the present embodiment includes at least one primary duct 40. When plural primary ducts 40 are provided, the number of electric wires 32 accommodated in each primary duct 40 can be reduced. As a result, the size of the primary duct 40 (e.g. the outer diameter) is reduced, and the degree of freedom of the laying position of the duct is improved. When plural primary ducts 40 are provided, the number of struts 27a may be increased depending on the number of primary ducts.

Second Embodiment

Figure 6:
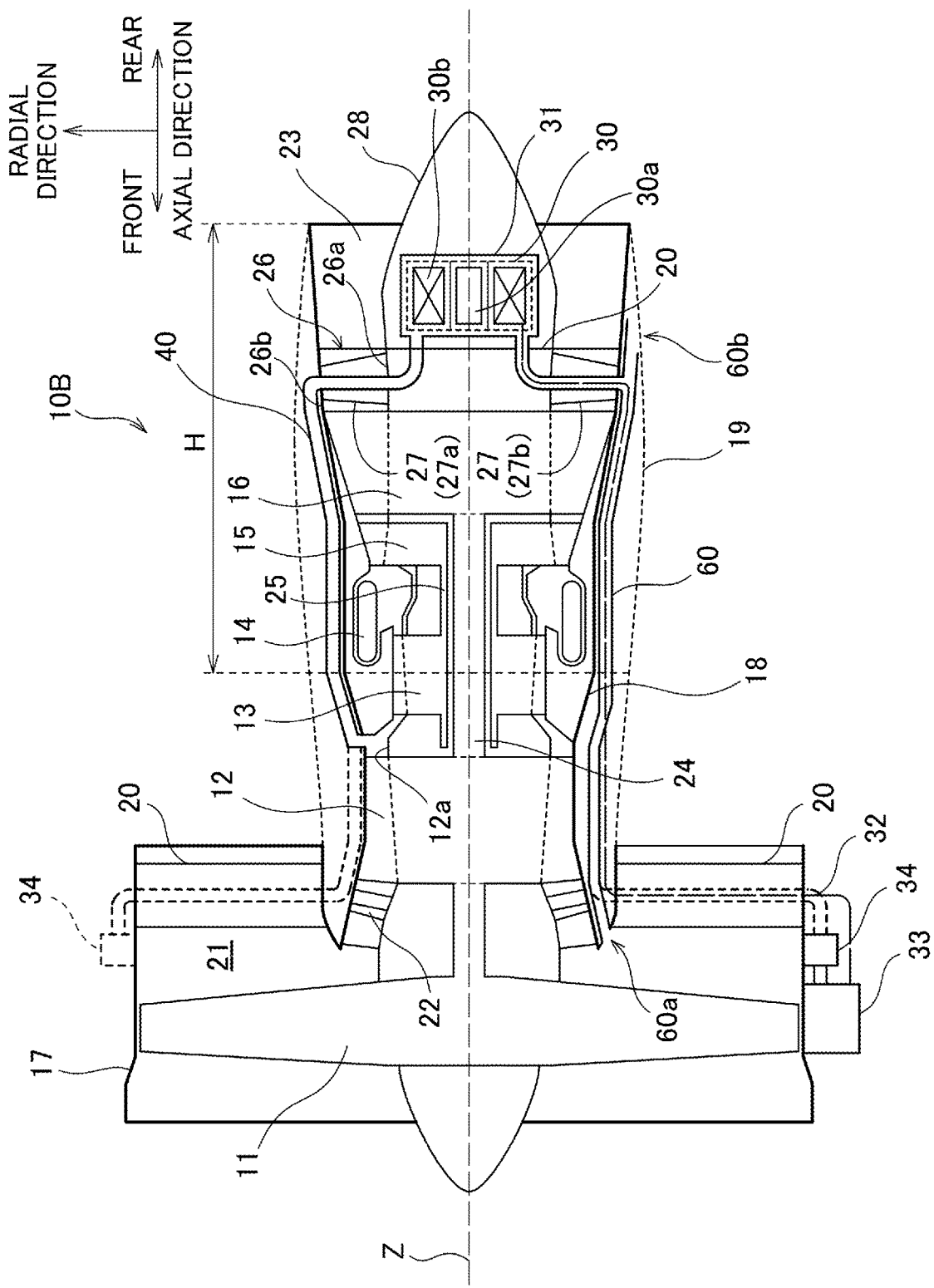
FIG. 6 is a diagram illustrating a configuration of a gas turbine engine (engine) for an aircraft, according to a second embodiment of the present disclosure.
Figure 7:
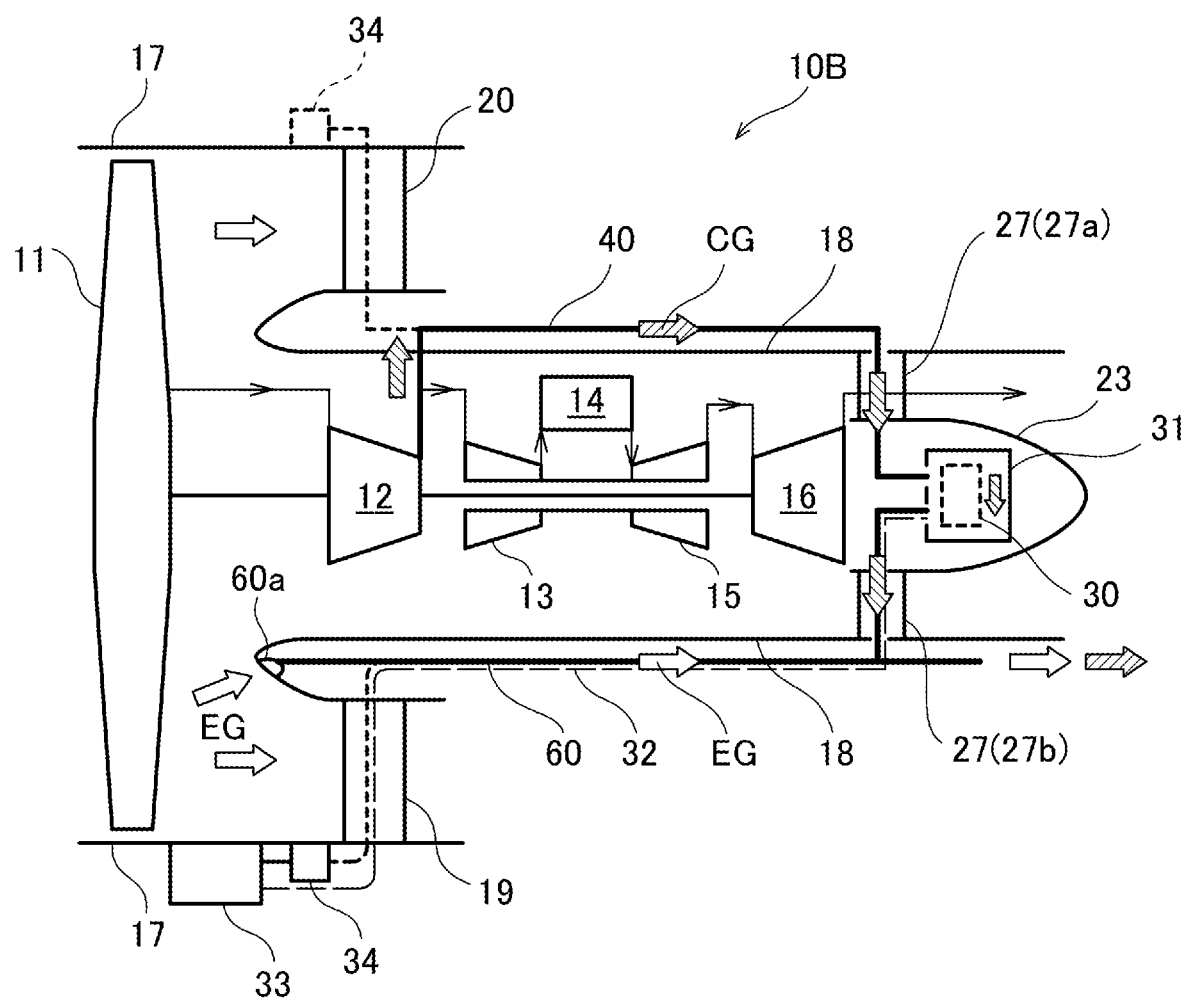
FIG. 7 is a diagram for explaining a cooling system according to a second embodiment.
Figure 8A:
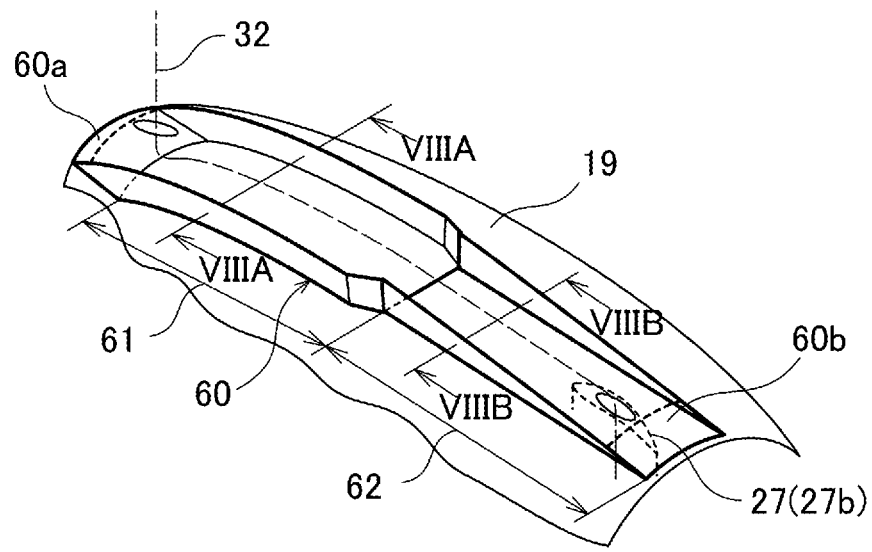
FIGS. 8A to 8C are views for explaining a secondary duct according to a second embodiment.
Figure 8B:
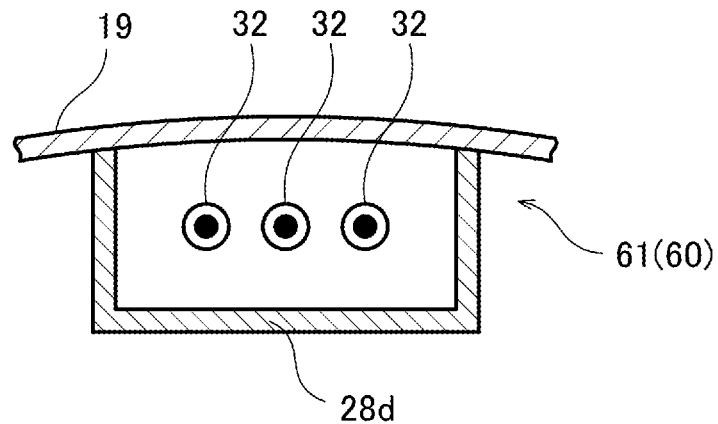
Figure 8C:
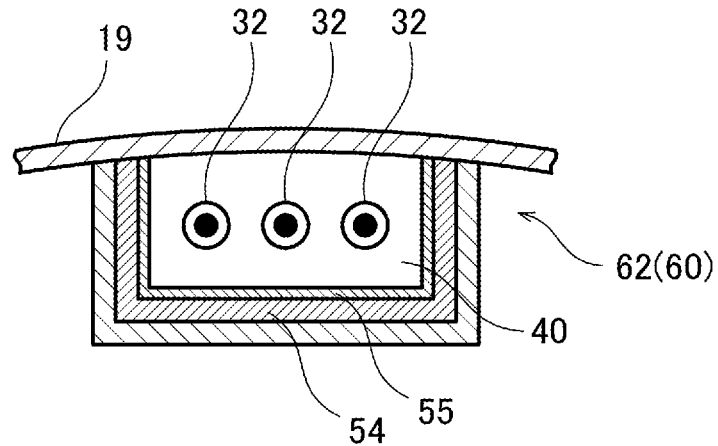

A second embodiment of the present disclosure will be described. FIG. 6 is a configuration diagram of an engine 10B according to a second embodiment. FIG. 7 is a diagram for explaining the cooling system according to the second embodiment. FIGS. 8A to 8C are views for explaining the secondary duct 60 according to the second embodiment. FIG. 8A is a perspective view of the entire secondary duct 60. FIG. 8B is a VIIIA-VIIIA cross-sectional view of the front secondary duct 61 in FIG. 8A. FIG. 8C is a VIIIB-VIIIB cross-sectional view of the rear secondary duct 62 in FIG. 8A.

The cooling system according to the second embodiment includes not only the primary duct (first duct) 40 but also the secondary duct (second duct) 60. In the second embodiment, the secondary duct 60 accommodates the electric wire 32 connecting between the electric generator 30 and the power converter 33. Further, the housing 31 does not have a discharge port for the cooling gas CG which opened in the tail cone 28. Since the other configurations are the same as those of the first embodiment, the same reference numerals are given to the overlapping configurations, and the description thereof is omitted.

As same as the primary duct 40, the secondary duct 60 constitutes a gas passage. The secondary duct 60 is also formed of heat-resistant alloy. However, part of the secondary duct 60 forward of the hot section H (e.g. the front secondary duct 61 described later) may be formed of flexible resin (e.g. carbon fiber reinforced plastics (CFRP)), elastic material such as an elastomer, or other non-metallic material.

As shown in FIGS. 6 and 7, the secondary duct 60 connects between the bypass passage 21 behind the fan 11 and the internal space of the housing 31 via the radially outside of the core casing 18 and the strut 27b of the struts 27 other than the struts 27a of the struts 27 through which the primary duct 40 passes. In other words, the secondary duct 60 extends from the bypass passage 21 to the housing 31 through the radial outside of the core casing 18 and the strut 27b.

As shown in FIGS. 6, 7, and 8A, the secondary duct 60 has an intake port 60a. The intake port 60a is opened, for example, forward of the outlet guide vane 20 on the outer peripheral surface of the core casing 18 facing the bypass passage 21. The secondary duct 60 branches at a position radially outward of the strut 27b in which the secondary duct 60 is laid, and opens toward the exhaust passage 23 as an exhaust port 60b.

As shown in FIGS. 8A and 8B, the secondary duct 60 includes a channel member located between the core casing 18 and the cover 19 and extending from the front to the rear of the engine 10B. The channel member has a C-shaped cross-section opened toward the cover 19. The opening of the channel member toward the cover 19 is covered by the cover 19, so that a space inside the secondary duct 60 is surrounded by the secondary duct 60 and the cover 19. The electric wire 32 is drawn out of the housing 31 and connected to the power converter 33 via the secondary duct 60 and the outlet guide vane 20.

Part of the secondary duct 60 from the strut 27b to the housing 31 has the same structure as the part of the primary duct 40 from the strut 27a to the housing 31. Therefore, the strut 27b has the same configuration as that of the strut 27a (see FIG. 5).

While the engine 10B is operating, the cooling gas CG extracted from the outlet passage 12a of the low-pressure compressor 12 flows into the housing 31 through the primary duct 40 to cool the electric generator 30. As described above, the housing 31 has no discharge port for the cooling gas CG that opened in the tail cone 28. Instead, the secondary duct 60 is connected to the housing 31. Accordingly, the cooling gas CG that has cooled the electric generator 30 flows into the secondary duct 60, passes through the strut 27b constituting part of the secondary duct 60, and is discharged from the exhaust port 60b.

In this manner, the cooling gas CG flows from the housing 31 to the exhaust port 60b through the strut 27b. By this flow of the cooling gas CG, part of the electric wire 32 from the housing 31 to the strut 27a is also cooled.

The exhaust gas EG from the fan 11 flows into the intake port 60a and is discharged from the exhaust port 60b. By this flow of the exhaust gas EG the electric wire 32 is also cooled. That is, the entire electric wire 32 accommodated in the secondary duct 60 is cooled by the cooling gas CG or the exhaust gas EG. Accordingly, thermal damage of the electric wire 32 due to heat from the hot section H can be prevented.

As shown in FIG. 8A, the secondary duct 60 may include a front secondary duct 61 connected to the bypass passage 21 and a rear secondary duct 62 extending from the front secondary duct 61 to the housing 31. The rear secondary duct 62 is provided at least in the hot section H. As shown in FIG. 8C, the rear secondary duct 62 may have the shielding structure 56 as described above. Specifically, the heat-insulating material 54 is provided on the inner surface of the rear secondary duct 62, and the sheath 55 is provided on the inner surface of the heat-insulating material 54. Both the heat-insulating material 54 and the sheath 55 have cross-sections similar to that of the rear secondary duct 62 and prevent excessive heat transfer (radiation) to the electric wire 32.

The front secondary duct 61 is provided at a position where heat resistance is not required. The front secondary duct 61 may be formed of, for example, flexible resin (e.g. carbon fiber reinforced plastics (CFRP)), elastic material such as an elastomer, or other non-metallic material. In this case, it is lighter than the rear secondary duct 62.

The number of electric wires 32 accommodated in the secondary duct 60 is arbitrary. For example, as shown in FIGS. 8B and 8C, plural electric wires 32 may be accommodated.

As same as the first embodiment, the primary duct 40 is connected to the outlet passage 12a of the low-pressure compressor 12 or the discharge port of the blower 34. However, when the primary duct 40 is connected to the discharge port of the blower 34, the secondary duct 60 may also be connected to the discharge port of the blower 34. When the primary duct 40 is connected to the outlet passage 12a of the low-pressure compressor 12, the secondary duct 60 may be connected to the exhaust port of the blower 34. That is, at least one of the primary duct 40 (upstream side of the front primary duct 41) and the secondary duct 60 (upstream side of the front secondary duct 61) may be connected to the discharge port of the blower 34.

When the secondary duct 60 is connected to the discharge port of the blower 34, the secondary duct 60 extends inside the outlet guide vane 20 and is connected to the discharge port of the blower 34. The electric wire 32 as described above is accommodated in the secondary duct 60.

A plurality of blowers 34 may be provided. In this case, the primary duct 40 and the secondary duct 60 may be individually connected to the outlet of the corresponding blower 34. Each blower 34 is not limited to be used for cooling, but may be used for blowing or ventilation, for example.

As described above, the cooling system according to each embodiment employs air cooling using a duct. Accordingly, the electric apparatus installed behind the turbine can be cooled with a simpler configuration than the oil cooling system. However, the cooling system as described above does not exclude the oil cooling system. That is, the cooling system according to the present embodiments can also be used in combination with an oil cooling system.

It should be noted that the present disclosure is not limited to the embodiments described above, but is indicated by the description of the claims and further includes all modifications within the same meaning and scope as the description of the claims.

What is claimed is:

1. A cooling system for an aircraft gas turbine engine, the cooling system comprising:
    a core casing configured to house a compressor, a combustion chamber, and a turbine;
    a tail cone configured to form at least part of an exhaust passage of the turbine together with the core casing;
    struts configured to connect between the core casing with a support body of the tail cone;
    a housing installed in the tail cone, configured to house an electrical apparatus; and
    at least one primary duct configured to connect between an internal space of the housing and an outlet passage of the compressor or a discharge port of a blower installed in the gas turbine engine via at least one of the struts and a radial outside of the core casing.

2. The cooling system according to claim 1, further comprising
    an electric wire configured to connect to the electrical apparatus; wherein
    the primary duct includes:
    a front primary duct connected to the outlet passage of the compressor or the discharge port of the blower;
    a rear primary duct connected to the housing; and an inter-connecting box provided radially outward of the core casing and contacting between the front primary duct and the rear primary duct; and the inter-connecting box includes a terminal board; and the electric wire is connected from the terminal board to the electric apparatus through the rear primary duct.

3. The cooling system according to claim 2, wherein the housing includes a discharge port.

4. The cooling system according to claim 2, wherein the rear primary duct includes a shielding structure against heat from the combustion chamber and the turbine.

5. The cooling system according to claim 3, wherein the rear primary duct includes a shielding structure against heat from the combustion chamber and the turbine.

6. The cooling system according to claim 1, further comprising a secondary duct configured to connect between a bypass passage behind the fan and the internal space of the housing via a radially outside of the core casing and a strut of the struts other than the strut through which the primary duct passes, wherein the secondary duct branches at a position radially outward of the strut in which the secondary duct is laid, and opens toward the exhaust passage.

7. The cooling system according to claim 6, further comprising an electric wire accommodated in the secondary duct and connected to the electrical device; wherein the secondary duct includes:

a front secondary duct connected to the bypass passage;

a rear secondary duct extending from the front secondary duct to the housing; and the rear secondary duct has a shielding structure against heat from the combustion chamber and the turbine.

\* \* \* \* \*